No. 716,555.  
Patented Dec. 23, 1902.
J. H. KING.
MACHINE FOR MAKING TUBULAR STRAINERS.
(Application filed Nov. 15, 1901.)
(No Model.)
2 Sheets—Sheet 1.
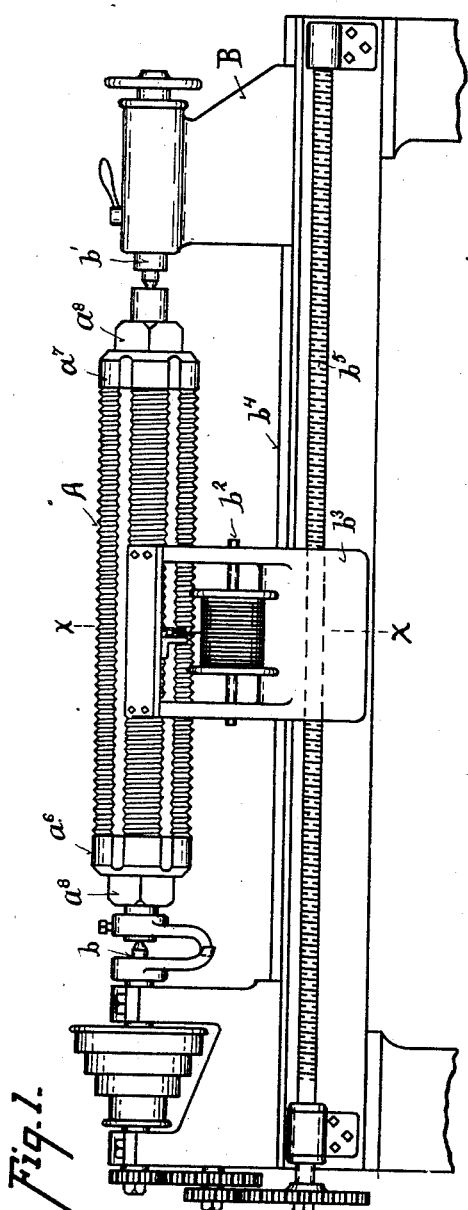
Fig. 1.
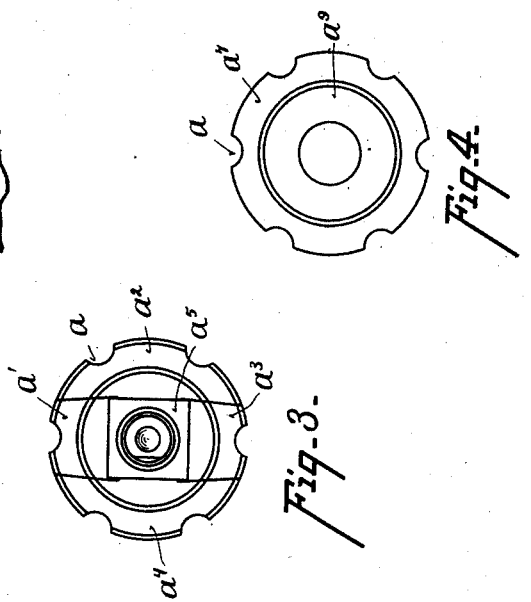
Fig. 4.
Fig. 3.
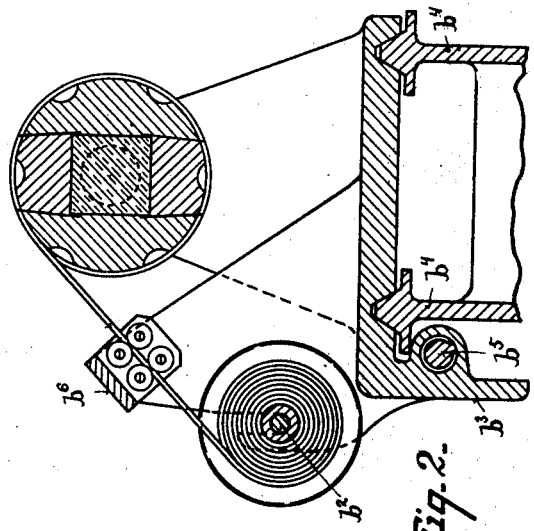
Fig. 2.
Witnesses  
C. W. Miles  
Emma Lyford
Inventor  
John H. King  
By Murray & Murray  
Attorneys No. 716,555. Patented Dec. 23, 1902.
J. H. KING.
MACHINE FOR MAKING TUBULAR STRAINERS.
(Application filed Nov. 15, 1901.)
(No Model.) 2 Sheets—Sheet 2.
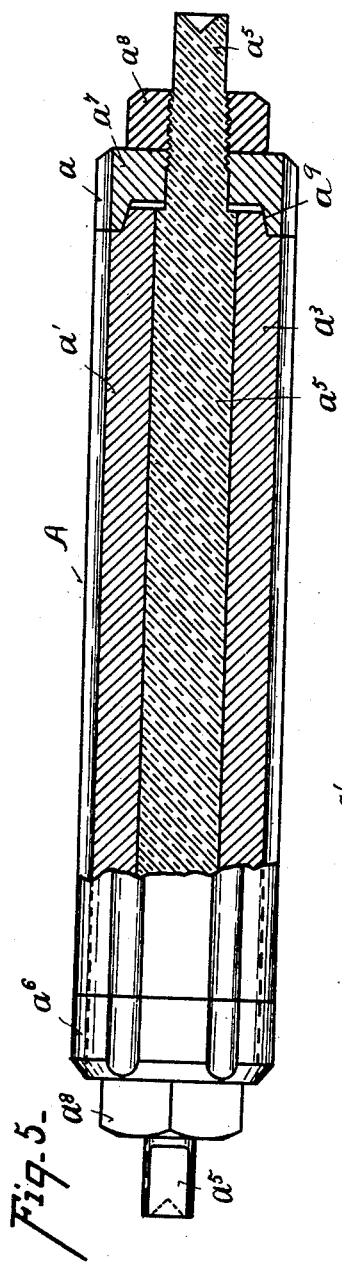
Fig. 5.
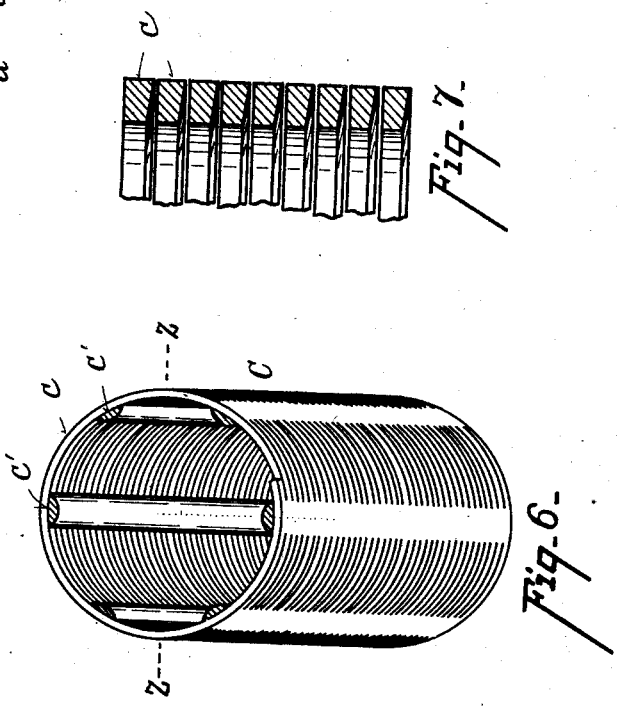
Fig. 7.
Fig. 6.
Witnesses
C. W. Miles,
Emma Lyford
Inventor
John H. King
By Murray & Murray
Attorneys

UNITED STATES PATENT OFFICE.

JOHN H. KING, OF COVINGTON, KENTUCKY, ASSIGNOR OF ONE-HALF TO THE KISINGER-ISON COMPANY, OF CINCINNATI, OHIO, A CORPORATION OF OHIO.

MACHINE FOR MAKING TUBULAR STRAINERS.

SPECIFICATION forming part of Letters Patent No. 716,555, dated December 23, 1902.

Application filed November 15, 1901. Serial No. 82,472. (No model.)

*To all whom it may concern:*

Be it known that I, JOHN H. KING, a citizen of the United States of America, and a resident of Covington, in the county of Kenton and State of Kentucky, have invented certain new and useful Improvements in Machines for Making Tubular Strainers, of which the the following is a specification.

The object of my invention is a machine for making a tubular strainer from a continuous wire. The means whereby I attain this object are described in the specification and illustrated in the accompanying drawings, in which—

Figure 1 is a view in side elevation of a machine embodying my invention. Fig. 2 is an enlarged transverse sectional view of the same, taken upon line $x\,x$ of Fig. 1. Fig. 3 is a detail end view of my mandrel with the clamping-cap removed from the end thereof. Fig. 4 is a detail plan view of the cap for holding the parts of the mandrel together, showing its interior taper. Fig. 5 is an enlarged detail view, partly in side elevation and partly in longitudinal section, of my mandrel. Fig. 6 is a detail perspective view of a tubular strainer made upon my machine. Fig. 7 is a sectional detail view of the same, taken upon line $z\,z$ of Fig. 6.

Strainer C, made upon the machine embodying my invention, consists of a continuous wire $c$, wound spirally into a tubular cylinder, leaving a narrow uniform slit between the spirals, which are bound together by interior transverse bars $c'$, soldered or brazed to them.

In my machine wire $c$ is wound upon a collapsible mandrel A, which is held between the head and tail stocks $b$ and $b'$, respectively, of a lathe B from a spool $b^2$, which is journaled upon a reciprocating carriage $b^3$, which is mounted upon lathe-bed $b^4$. Carriage $b^3$ is reciprocated by a feed-screw $b^5$, journaled in brackets upon the side of the lathe-bed and geared to the head-stock by gearing which keeps the rate of rotation of the feed-screw and of the spindle of the head-stock such that a narrow uniform slit is left between the spirals.

In going from spool $b^2$ to mandrel A wire $c$ passes through a wire-straightener $b^6$, likewise mounted upon the carriage $b^3$.

Mandrel A is divided longitudinally into four sections $a'$, $a^2$, $a^3$, and $a^4$, which when placed together fit snugly about a square shaft or spindle $a^5$ and upon the exterior form a cylinder. Sections $a'$ and $a^3$ are in cross-section that of an isosceles triangle whose base is of the same width as shaft $a^5$ and whose apex is cut off by the periphery of the cylinder, sections $a^2$ and $a^4$ being similar and of the shape of a cylinder with sections $a'$ and $a^3$ and shaft $a^5$ cut out. Sections $a'$, $a^2$, $a^3$, and $a^4$ are tapered upon both ends, which are engaged by clamping-caps $a^6$ and $a^7$ of the same circumference as the mandrel, with longitudinal grooves similar to those of the mandrel and tapered upon the interior $a^9$, similarly to the ends of sections $a'$, $a^2$, $a^3$, and $a^4$, so that when nuts $a^8\,a^8$ are screwed down against said caps the sections are held firmly together and that when the nuts are removed the caps may be easily slipped off, shaft $a^5$ pulled out, and the mandrel collapsed. I prefer to have the mandrel externally screw-threaded to assist in keeping the spirals spaced properly, but its surface may be left smooth. After the wire has been wound upon the mandrel its end is clamped to the mandrel, which is then removed from the lathe. Transverse bars $c'$ are then pushed into the longitudinal grooves in the mandrel beneath the spirals and are soldered or otherwise secured to the spirals. The nuts and clamping-caps are then removed from the ends of the mandrel, when upon knocking upon the ends of shaft $a^5$ it is easily withdrawn and the mandrel collapses.

What I claim is—

1. In combination with a lathe, a collapsible mandrel upon which to wind a spiral strainer mounted between the head and tail stocks, a spool for wire mounted upon the reciprocating carriage, and suitable gearing coupling the feed-screw of the carriage and the spindle of the head-stock to produce a predetermined distance between the spirals, substantially as shown and described.

2. A collapsible cylindrical mandrel upon which to wind wire, having longitudinal grooves to receive bars transverse to the spirals of the wire, substantially as shown and described.

3. A mandrel upon which to wind wire, divided longitudinally into collapsible sections and having longitudinal grooves upon its exterior and having means for holding the sections in place while the wire is being wound thereon, substantially as shown and described.

4. A mandrel consisting of longitudinal sections to fit together about an interior shaft to form a cylinder longitudinally grooved exteriorly and tapered upon both ends to engage caps, caps tapered interiorly to engage the tapers and having longitudinal grooves to register with the aforesaid grooves, and nuts to engage the shaft and hold the caps in engagement with the sections, substantially as shown and described.

JOHN H. KING.

Witnesses:
W. F. MURRAY,
EMMA LYFORD.